(12) United States Patent
Sun et al.

(10) Patent No.: US 11,124,899 B2
(45) Date of Patent: Sep. 21, 2021

(54) METHOD FOR PREPARING CELLULOSE FIBER

(71) Applicant: China Textile Academy, Beijing (CN)

(72) Inventors: Yushan Sun, Beijing (CN); Ting Li, Beijing (CN); Chunzu Cheng, Beijing (CN); Libing Ding, Beijing (CN); Jian Cai, Beijing (CN); Qiang Luo, Beijing (CN); Yunan Zhou, Beijing (CN); Dong Zhang, Beijing (CN); Jigang Xu, Beijing (CN)

(73) Assignee: CHINA TEXTILE ACADEMY

( * ) Notice: Subject to any disclaimer, the term of this patent is extended or adjusted under 35 U.S.C. 154(b) by 306 days.

(21) Appl. No.: 16/317,049

(22) PCT Filed: Dec. 27, 2016

(86) PCT No.: PCT/CN2016/112375
§ 371 (c)(1),
(2) Date: Jan. 11, 2019

(87) PCT Pub. No.: WO2018/014510
PCT Pub. Date: Jan. 25, 2018

(65) Prior Publication Data
US 2019/0292683 A1    Sep. 26, 2019

(30) Foreign Application Priority Data
Jul. 22, 2016  (CN) .......................... 201610587548.X (51) Int. Cl.
*D01D 10/06*    (2006.01)
*D01F 2/08*     (2006.01)
(Continued)

(52) U.S. Cl.
CPC ............... *D01D 10/06* (2013.01); *D01D 1/02* (2013.01); *D01D 5/06* (2013.01); *D01F 2/00* (2013.01); *D01F 2/08* (2013.01)

(58) Field of Classification Search
CPC ...................................................... D01D 10/06
See application file for complete search history.

(56) References Cited

U.S. PATENT DOCUMENTS 4,124,674 A * 11/1978 Pieper .................... D01D 10/06
                                                              264/206
4,246,221 A *  1/1981 McCorsley, III ......... D01F 2/00
                                                              264/203
(Continued)

FOREIGN PATENT DOCUMENTS

| CN | 101280476 | 10/2008 |
| CN | 101942712 |  1/2011 |

(Continued)

OTHER PUBLICATIONS

Jiang, Xiaoya, et al. "A review on raw materials, commercial production and properties of lyocell fiber." Journal of Bioresources and Bioproducts (Jun. 24, 2020). (Year: 2020).*

(Continued)

*Primary Examiner* — Benjamin A Schiffman
(74) *Attorney, Agent, or Firm* — Sand, Sebolt & Wernow Co., LPA (57) ABSTRACT

The present disclosure discloses a method for preparing cellulose fiber. The method includes the following steps: 1) mixing cellulose pulp with NMMO aqueous solution of a mass concentration of 60%-85%, preferably 70% to 76%, to obtain a uniform mixture; 2) subjecting the obtained uniform mixture to dewatering for swelling, dissolution, and deaerating to obtain a cellulose spinning stock solution; 3) the cellulose spinning stock solution entering into a spinning machine after being filtered and heat exchange, and entering (Continued)

into a coagulation system after carrying out extruding by a spinneret-pack and cooling by air, and then coagulating in a NMMO coagulating bath of a mass concentration of 50% to 72% to obtain nascent fiber; and 4) subjecting the nascent fiber to rinsing to obtain a fiber filament bundle, and then, performing subsequent-section treatment to obtain cellulose fiber.

13 Claims, 3 Drawing Sheets

(51) Int. Cl.
  *D01D 1/02* (2006.01)
  *D01D 5/06* (2006.01)
  *D01F 2/00* (2006.01)

(56) References Cited

U.S. PATENT DOCUMENTS

| | | | |
|---|---|---|---|
| 6,183,865 B1* | 2/2001 | Yabuki | D01F 2/00 |
| | | | 428/364 |
| 6,852,413 B2* | 2/2005 | Lee | B60C 9/0042 |
| | | | 428/393 |
| 8,962,821 B2* | 2/2015 | Zhang | C08B 1/003 |
| | | | 536/30 |
| 9,670,596 B2* | 6/2017 | Koide | D01F 9/00 |
| 9,702,062 B2* | 7/2017 | Sugimoto | B29C 48/05 |
| 10,208,402 B2* | 2/2019 | Zikeli | D01D 5/06 |
| 2011/0003148 A1* | 1/2011 | Lee | D01F 2/00 |
| | | | 428/364 |
| 2013/0228949 A1 | 9/2013 | Chou | |
| 2016/0298269 A1* | 10/2016 | Cha | D01D 10/06 |
| 2019/0024263 A1* | 1/2019 | Jin | D01D 5/06 |

FOREIGN PATENT DOCUMENTS

| | | |
|---|---|---|
| CN | 101988216 | 3/2011 |
| CN | 102234852 | 11/2011 |
| CN | 106222771 | 12/2016 |

OTHER PUBLICATIONS

Liu, Ruigang, and Xuechao Hu. "Precipitation kinetics of cellulose in the Lyocell spinning process." Industrial & engineering chemistry research 45.8 (Mar. 21, 2006): 2840-2844. (Year: 2006).*

Biganska, Olga, and Patrick Navard. "Kinetics of precipitation of cellulose from cellulose—NMMO-water solutions." Biomacromolecules 6.4 (Jun. 15, 2005): 1948-1953. (Year: 2005).*

Zhang, Yaopeng, et al. "Formation and Characterization of Cellulose Membranes from N-Methylmorpholine-N-oxide Solution." Macromolecular Bioscience 1.4 (Jul. 4, 2001): 141-148. (Year: 2001).*

Wu, Guoming et al., "New Solvent Method Cellulose Fiber-Lyocell". Polymer Processing Technology, Jul. 31, 2000 (Jul. 31, 2000), p. 233, paragraph 4 to p. 237, paragraph 2 and p. 134, the last paragraph.

Duan, Julan et al., "The Influeance of the Coagulation Bath Concentration on the Mechanical Properties and the Maximum Spinning Speed of Lyocell Fiber", Synthetic Fiber in China, vol. 28, No. 06, Dec. 15, 1999 (Dec. 15, 1999), ISSN: 1001-7054, pp. 5-8.

* cited by examiner

METHOD FOR PREPARING CELLULOSE FIBER

TECHNICAL FIELD

The present disclosure belongs to the technical field of cellulose and specifically relates to a method for preparing cellulose fiber.

BACKGROUND

In the process of preparing cellulose fibers by dissolving cellulose in an N-methyl morpholinyl-N-oxide (NMMO) aqueous solution, the cellulose swelling and dissolving processes and effects of NMMO on cellulose are directly related to stability of spinning and performance of final products. And the concentration of a spinning stock solution and whether a processing process is energy-saving or not are directly related to the economic benefit and industrial popularization of the process technology. Taking this into consideration, in industrial production, an energy-saving and high-efficiency method for preparing the cellulose fibers is especially important.

In the prior art, in the process of preparing cellulose fibers, the concentration of an NMMO aqueous solution to be recycled is low, as described in CN101089262A and CN1318115A, generally 10%-30%. The concentration of a feedstock NMMO aqueous solution required for preparing a stock solution is high, as described in CN1468889A and CN1635203A, generally 80%-88%. The volume of evaporated water required for recycling is huge, and energy-saving multi-effect evaporating equipment is generally adopted; however, high-concentration-difference concentrating still needs multistage evaporation and consumes a great deal of water, electricity and vapor, and the investment of the multi-effect evaporating equipment is large, so that the production cost is too high, and high-efficiency low-consumption industrial production is difficult to achieve.

In addition, a single low-concentration coagulating mode easily causes intense coagulating, resulting in the formation of a sheath-core structure of the fiber, which is detrimental to the uniformity and mechanical properties of the fiber. Furthermore, the high-concentration NMMO aqueous solution required for preparing the stock solution has a safety risk in evaporation, storage and transportation. And there is a problem of repeated energy consumption during the preparation of the stock solution, and equipment and process flows for preparing the stock solution are too tedious.

In view of this, the present disclosure is provided.

SUMMARY

An object of the present disclosure is to overcome the shortcomings of the prior art, and provide a method for preparing cellulose fiber. Through comprehensively using a NMMO aqueous solution of a relatively lower concentration to directly swell cellulose, a NMMO aqueous solution of a relatively higher concentration as coagulating bath to coagulating filament bundle and using a more water-saving rinsing mode and a more energy-saving evaporation concentrating technology, the present disclosure can greatly reduce equipment investment, simplify processing, reduce the energy consumption and the industrialization cost, and can facilitate the safe production, improve the uniformity and mechanical properties of the fiber, so that the preparation technology is more applicable to high-efficiency low-consumption industrial production.

In order to solve the technical problem described above, a technical solution of the present disclosure is as follows:

A method for preparing cellulose fiber, wherein the method comprises the following steps:

1) mixing cellulose pulp with NMMO aqueous solution of a mass concentration of 60%-85%, preferably 70%-76%, to obtain uniform mixture;

2) subjecting the obtained uniform mixture to dewatering for swelling and dissolution, and deaerating to obtain cellulose spinning stock solution;

3) the cellulose spinning stock solution entering into a spinning machine after being filtered and heat exchange, and entering into a coagulating system after carrying out extruding by spinneret-pack and cooling by air, and then coagulating in a NMMO coagulating bath of a mass concentration of 50% to 72% to obtain nascent fiber; and 4) subjecting the nascent fiber to rinsing to obtain fiber filament bundles, and then, performing subsequent-section treatment to obtain cellulose fiber.

According to the method for preparing the cellulose fiber, provided by the present disclosure, in a preparation section of the spinning stock solution, the NMMO aqueous solution with a relatively low concentration is uniformly mixed with the cellulose pulp directly, thus, the safety risks during the evaporation, storage and transportation of the high-concentration NMMO aqueous solution are eliminated, and energy consumption required for preparing high-concentration NMMO is lowered. Wherein, in order to balance the uniformity of the mixture prepared by mixing the NMMO aqueous solution and the pulp and the convenience in subsequent continuous homogeneous-phase transportation, a concentration of a feeding NMMO aqueous solution is 70%-76% preferably. And the pulp does not need any additional treatment, so that the problem of repeated energy consumption during preparation is avoided, the equipment investment is greatly reduced, and the overall stock solution preparation flows are simplified.

In the present disclosure, the cellulose pulp comprises one or a mixture of several of dissolved-pulp-grade cellulose pulp, bamboo pulp, starch pulp and hemp pulp. And the cellulose pulp may be a mixture of different polymerization degrees or/and different varieties, no additional treatment is required, and a cellulose mass concentration is 8%-22%. The NMMO mass concentration of an NMMO aqueous solution for feeding is 60%-85%, preferably 70%-76%.

In a forming section of the cellulose fiber, the coagulating system performs coagulating by adopting an NMMO aqueous solution of a relatively higher concentration. Thus, a fiber coagulating process is decelerated, and the forming of skin-core structures of the fibers is avoided. In addition, the undiffused solvent plays the action of a plasticizer during fiber drawing, which facilitates the formation of a condensed structure inside the fiber. And the coagulating system is more beneficial to the homogenization of the fibers and the improvement of mechanical properties.

As a preferred embodiment, in the method provided in the present disclosure, along with the proceeding of the method, a low-concentration NMMO aqueous solution, obtained after rinsing, is continuously added into the coagulating system in step 3), a high-concentration NMMO aqueous solution is discharged into a recycling section, a mass concentration of a NMMO aqueous solution coagulating bath contained in the coagulating system is kept stable under the condition of effective circulation of the NMMO aqueous solution coagulating bath, and the high-concentration NMMO aqueous solution entering the recycling section is subjected to recycling treatment and then is mixed with the cellulose pulp in step 1).

In the present disclosure, the low-concentration NMMO aqueous solution means an NMMO aqueous solution of a mass concentration which is higher than 0% and not higher than 50%; and the high-concentration NMMO aqueous solution means an NMMO aqueous solution of a mass concentration which is higher than 50% and not higher than 72%.

In the existing process, the difference between a concentration of NMMO to be recycled and a concentration required for feeding is too large and is generally higher than 50%. The concentrating of 50% is equivalent to evaporating the same amount of water as pure solvent. The volume of evaporated water is large, and the equipment investment and energy consumption are high. On the basis of this, the concentration difference to be evaporated is reduced and is reduced to be lower than 26% in a preferred embodiment, the volume of the evaporated water is reduced by at least a half, and the energy consumption and the equipment investment will also be greatly reduced. In view of this concentration difference, a matched proper preparation method is required to be found, the present disclosure is gained by the inventor after carrying out a large number of tests. Namely, a feeding-proper concentration is finally determined through reducing the concentration of the NMMO aqueous solution required for feeding as much as possible while taking into consideration the mixing effect and the uniform stability and swelling effect of subsequent transportation. And that is matched with an optimal stock solution preparation scheme, i.e., continuous stepwise dewatering, and a dewatering scheme can be determined according to working conditions to guarantee the uniform preparation of the stock solution under any working condition. In addition, an optimal coagulating bath concentration range is finally determined through improving a coagulating bath concentration as much as possible while taking a coagulating effect and influence on the forming and properties of fibers into account. And by an assisting multistage coagulating system, a more water-saving rinsing mode and a more energy-saving evaporating technology, the whole method is greatly energy-saving compared with the existing technology, and uniform and high-yield cellulose fibers can be prepared.

Figure 1:
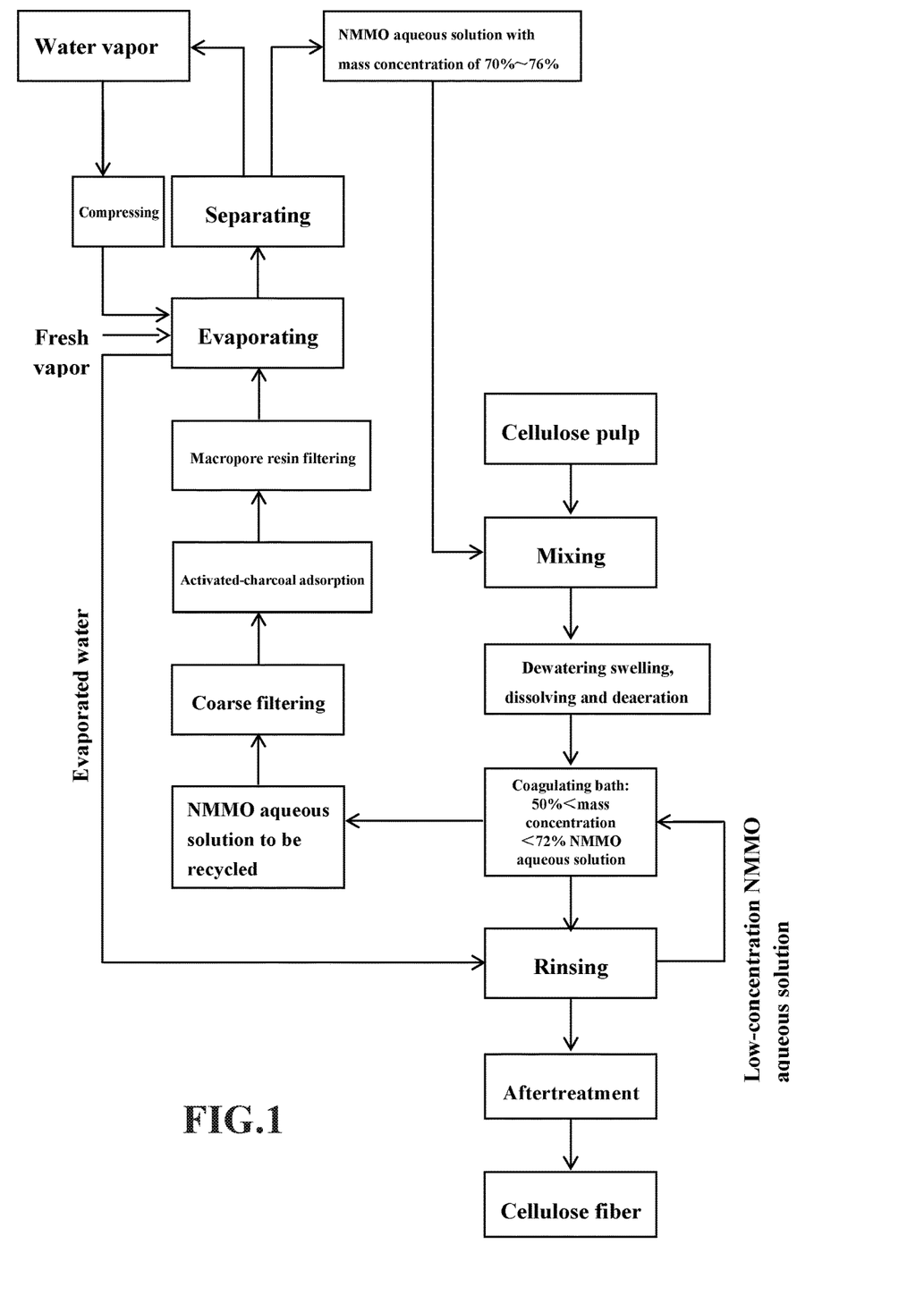
FIG. 1 is a process flow schematic diagram of a preferred preparation scheme provided by the present disclosure.

Further, the NMMO aqueous solution to be recycled in the recycling section is subjected to coarse filtering, activated-charcoal adsorption and macropore resin filtering sequentially, and then enters to an evaporation section to be, concentrated till a required feeding concentration a for mixing with the cellulose pulp in step 1). A process flow diagram is as shown in FIG. 1.

In the present disclosure, the NMMO aqueous solution to be recycled in the recycling section is a high-concentration NMMO aqueous solution discharged from the coagulating system.

In the evaporation section, the number of evaporation stage is determined according to concentration difference between the NMMO aqueous solution to be recycled and a concentrated feeding-required NMMO aqueous solution, preferably the concentration difference between the NMMO aqueous solution to be recycled and the concentrated feeding-required NMMO aqueous solution is smaller than 26%, and the number of evaporation stage is not greater than two.

In the present disclosure, a more energy-saving evaporating technology is selected, the evaporated water vapor is compressed and then returns to an evaporator as a heat source, after a system is stable, raw vapor is not consumed anymore, and relatively-cheap electricity is consumed mainly. The evaporated water resulting from evaporation enters a rinsing section to achieve the aim of cyclic utilization.

In step 2), a dewatering process comprises one-step dewaterin or continuous stepwise dewatering, preferably the dewatering process comprises the continuous stepwise dewatering.

In the present disclosure, the continuous stepwise dewatering is preferred, and retention time of each step is adjustable. The design of continuous stepwise dewatering, not only makes the mixture swell and the filming is better, but also facilitates the subsequent dissolving, thereby facilitating uniform and high-quality preparation of the stock solution; and conducives to uniform swelling and dissolving, and the preparation of the high-concentration and uniform spinning stock solution can be achieved, a mass concentration of cellulose is improved. And for industrial production, the improvement of cellulose concentration means productivity increase which means economy.

In step 3), the coagulating system is one-stage coagulating system or multistage coagulating system, preferably the coagulating system is the multistage coagulating system; and a temperature of a coagulating bath of each stage is independently adjustable in a range of 10-80° C.

In the multistage coagulating system, NMMO concentrations of coagulating baths of all stages are gradually lowered, and an NMMO concentration of a coagulating bath of a first stage is higher than 50% and lower than 72%, preferably not lower than 51% and not higher than 65%.

In step 4), a rinsing process comprises one-section rinsing or multi-section rinsing, preferably the rinsing process is multi-section spray rinsing, and rinsing water and the fibers move in opposite directions; and a temperature of the rinsing water is in a range of 10-80° C., preferably temperatures of all sections decrease by gradient. In the present disclosure, the multi-section spray rinsing is adopted as a preferred rinsing mode, due to a sectioned design of rinsing, concentrations of each sections decreases by gradient, and temperatures of rinsing water of all sections are different, so that the consumption of the rinsing water is saved to the utmost, and the amount of recycled evaporated water is reduced indirectly, and the energy consumption is greatly reduced.

In the multi-section spray rinsing, a volume of spray water of each section is strictly controlled, the rinsing water is sequentially returns returned to upper section for rinsing in the upper section; and NMMO concentrations of the spray water in all sections are gradually decreased, and the spray water of a final section comes from water by recycling water vapor.

After adopting the above-mentioned technology, compared with the prior art, the present disclosure has the following beneficial effects.

According to the low-energy-consumption preparation technology for the cellulose fibers, provided by the present disclosure, in a preparation section of the stock solution, the NMMO aqueous solution with a relatively low concentration is uniformly mixed with the cellulose pulp directly, and thus, the safety risks during the evaporation, storage and transportation of the high-concentration NMMO aqueous solution are eliminated; and the pulp does not need any additional treatment, so that the problem of repeated energy consumption during preparation is avoided, the equipment investment is greatly reduced, and the overall stock solution preparation flows are simplified. Furthermore, due to a continuous stepwise dewatering design, the swelling and filming effect of the mixture is better, the subsequent dissolving is facilitated, and thus, the uniform and high-quality preparation of the stock solution is facilitated. By the technology, the preparation of the high-concentration and uniform spinning stock solution can also be achieved, and a mass concentration of cellulose is improved; and for industrial production, productivity increase means economy.

In the present disclosure, in a forming section of the cellulose fibers, a coagulating system performs coagulating by adopting an NMMO aqueous solution of a relatively high concentration. Thus, a fiber coagulating process is decelerated, and the forming of skin-core structures of the fibers is avoided. In addition, the undiffused solvent plays the action of a plasticizer during fiber drawing, which facilitates the formation of a condensed structure inside the fiber. And the coagulating system is more beneficial to the homogenization of the fibers and the improvement of mechanical properties.

In the present disclosure, in a preferred water-saving rinsing mode, due to a sectioned design of spray rinsing, concentrations of each sections decreases by gradient, and temperatures of rinsing water of each section is different, so that the consumption of the rinsing water is saved to the utmost, and the amount of recycled evaporated water is reduced indirectly, and the energy consumption is greatly reduced.

In the present disclosure, a more energy-saving evaporating technology is selected, evaporated water vapor is compressed and then returns to an evaporator as a heat source, after a system is stable, raw vapor is not consumed anymore, and relatively-cheap electricity is consumed mainly.

In addition, according to the preparation technology for the cellulose fibers, provided by the present disclosure, an NMMO aqueous solution with a relatively high concentration (compared with the conventional) is recycled, an NMMO aqueous solution with a relatively low concentration (compared with the conventional) is fed, the concentrated concentration difference of an NMMO aqueous solution to be evaporated is greatly reduced, the evaporation number of stages is reduced, the volume of evaporated water is greatly reduced, the process flows are simplified, thus, the investment of evaporating equipment is greatly reduced, and the energy consumption of evaporation is greatly lowered; and in the entire recycling system, both an NMMO solvent concentration and a process temperature are not high, which facilitates safe production, storage and transportation.

Hence, the low-energy-consumption preparation technology for the cellulose fibers, provided by the present disclosure significantly reduces the industrialization cost.

The specific embodiments of the present disclosure are further described in detail below with reference to the drawings.

Figure 2:
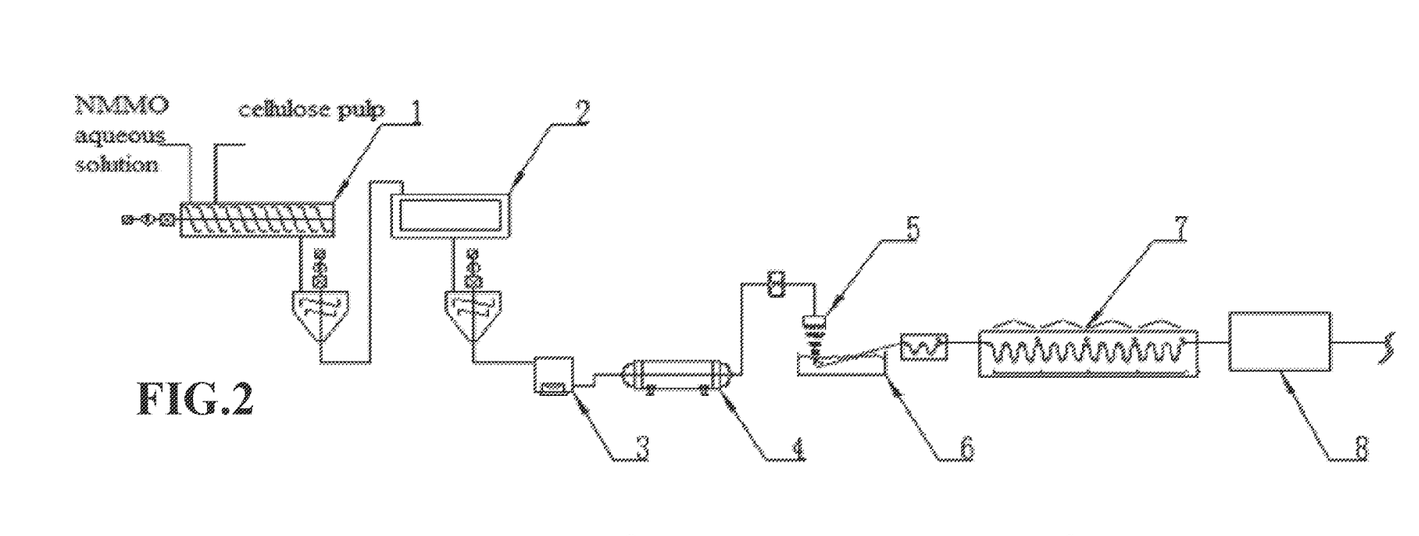
FIG. 2 is an equipment flow schematic diagram of the method provided by the present disclosure.

In which, 1—mixer; 2—dewatering device; 3—filter; 4—heat exchanger; 5—spinning machine (containing a spinneret); 6—coagulating system; 7—rinsing equipment; 8—aftertreatment device.

It is necessary to note that these drawings and word descriptions are not aimed at restricting the concept scope of the present disclosure in any way, but declaring the conception of the present disclosure to those skilled in the art through referring to specific embodiments.

DETAILED DESCRIPTION

In order to make objects, technical schemes and advantages of the embodiments of the present disclosure clearer, the technical schemes of the embodiments are clearly and completely described below with reference to the drawings of the embodiments of the present disclosure; and the following embodiments are used for describing the present disclosure, but not limiting the scope of the present disclosure.

Referring to FIG. 1 to FIG. 5, the low-energy-consumption preparation technology for the cellulose fibers, provided by embodiments of the present disclosure, comprises the specific steps: NMMO aqueous solution and cellulose pulp free of any treatment were directly and uniformly mixied, and a uniform mixture was obtained in the mixer 1 under a certain temperature and mechanical stirring. The obtained uniform mixture was sufficiently evaporated to dewater for swelling and dissolved and deaerated in a dewatering device 2 by one-step or continuous stepwise evaporated-dewatering to obtain a cellulose spinning stock solution. The prepared spinning stock solution was filtered by a filter 3 and exchanged heat by a heat exchanger 4, then, entered to a spinning machine 5, and was extruded by spinneret-pack and cooled by air, then entered to a coagulating system 6 to obtain nascent fibers. The obtained nascent fibers were rinsed by rinsing equipment 7 to obtain fiber filament bundles, then filament bundles entered to an aftertreatment device 8, and were cut, dried, curled etc, or directly were dried and curled by hot-roll, to obtain the cellulose fibers.

Referring to FIG. 1, the NMMO aqueous solution in a recycling section is subjected to coarse filtering, activated-charcoal adsorption and macropore resin filtering, then, enters a solvent evaporation section, is evaporated, then enters an evaporator and then enters a separator, water vapor generated by the evaporator and a concentrated product with a required NMMO concentration obtained through evaporation concentration are separated. The water vapor is compressed and then returns to the evaporator as a heat source, and the concentrated product with a required NMMO concentration obtained through evaporation concentration returns to dissolve cellulose. The employed evaporation concentration technique used in the present disclosure compresses and reuses water vapor evaporated from the evaporator as a heat source to return to the evaporator, in addition to the initial introduction of raw steam, the raw steam is no longer consumed after stabilization, and is concentrated by evaporation to the desired NMMO concentration for dissolution of cellulose for recycling. The high-concentration NMMO aqueous solution displaced by the overflow during the fiber preparation process is returned for recovery to achieve system balance. In the embodiments, energy consumption conditions are reflected by concentration difference between the NMMO aqueous solution to be recycled and the concentrated feeding-required NMMO aqueous solution and the number of evaporation stage.

Embodiment 1

The NMMO aqueous solution with a mass concentration of 72% and cellulose pulp free of any treatment were directly and uniformly mixied, and a uniform mixture was obtained in the mixer 1 under a certain temperature and mechanical stirring. In which, the pulp is prepared through mixing cellulose wood pulp of high and low polymerization degrees, the mass ratio of wood pulp DP:800 to wood pulp DP:450 is 8:92, a cellulose concentration is 12%.

Figure 3:
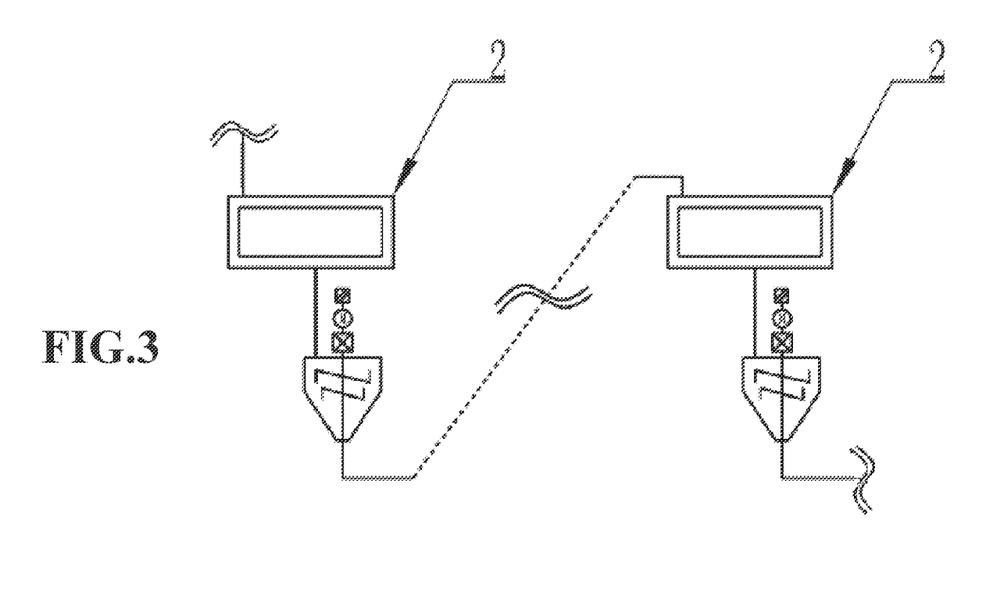
FIG. 3 is a schematic diagram of continuous stepwise dewatering of the method provided by the present disclosure.

The obtained uniform mixture was sufficiently evaporated to dewater for swelling, and dissolved and deaerated in a dewatering device 2 by continuous two-step evaporated-dewatering to obtain a cellulose spinning stock solution, referring to FIG. 3. A first-step evaporated dewatering process is mainly a full-swelling mixing process, and the retention time was 20 min, and a second-step evaporated dewatering process is mainly used for removing surplus moisture and dissolving the cellulose into a homogeneous-phase solution, i.e., the spinning stock solution. The spinning stock solution has the refractive index of 1.48365 and viscosity of 2026 Pa·S.

Figure 4:
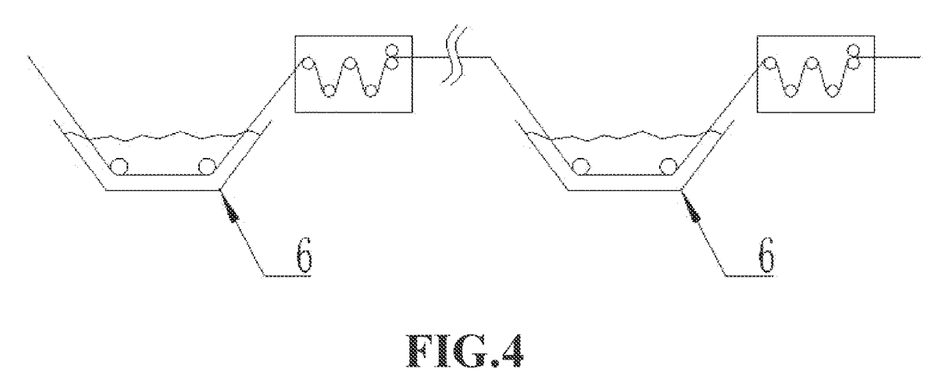
FIG. 4 is a schematic diagram of a multistage coagulating system of the method provided by the present disclosure.

The prepared spinning stock solution was subjected to two-stage filtration (a 30 filter mesh is adopted during coarse filtering; and a 15 filter mesh is adopted during fine filtering) by the filter 3, and is heat exchanged to a temperature of 90° C. by the heat exchanger 4, then, entered to the spinning machine 5, and was extruded by the spinneret-pack and cooled by air, then, entered to the coagulating system 6 which is a two-stage conagulating system, referring to FIG. 4. The first-stage coagulating bath has an NMMO concentration of 55% and a temperature of room temperature; the second-stage coagulating bath has an NMMO concentration of 30% and a temperature of 40° C., thereby obtaining the nascent fiber. Thereinto, the stable concentration of the coagulating bath is achieved by continuously returning to the downstream of the coagulation bath containing the NMMO water bath and self-circulation.

Figure 5:
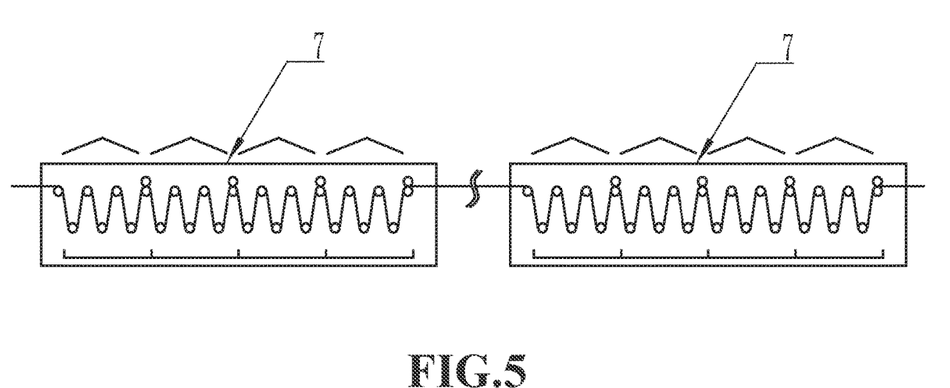
FIG. 5 is a schematic diagram of multi-section spray rinsing of the method provided by the present disclosure.

The nascent fibers were subjected to rinsing by the rinsing equipment 7, referring to FIG. 5. The rinsing equipment is four-section spray rinsing equipment, wherein spray water of the first section has a concentration of 15% and a temperature of 60° C., spray water of the second section has a concentration of 8% and a temperature of 50° C., spray water of the third section has a concentration of 3% and a temperature of 40° C., and spray water of the fourth section has a concentration of 0% and a temperature of 40° C. and comes from recycled evaporated water; the spray water and the fibers move in opposite directions. The rinsing water returned to upper stage sequentially and is applied to the upper-stage spraying to obtain fiber filament bundles. Then the fiber filament bundles entered the aftertreatment device 8 and were treated by the subsequent-sections to obtain the cellulose fibers.

The NMMO aqueous solution in the recycling section was subjected to coarse filtering, activated-charcoal adsorption and macropore resin filtering and then entered the solvent evaporation section with two-stage evaporation. A novel evaporating technology is adopted, in which the evaporated water vapor was compressed and then returned to the evaporator as a heat source, and after stabilization, raw vapor is not consumed anymore and electricity is consumed mainly. The NMMO aqueous solution was concentrated to 72% NMMO and was used for dissolving cellulose. The evaporated water from evaporation entered the rinsing section as a source of spray water of the final section to achieve the aim of cyclic utilization.

The prepared fibers have the strength of 4.43 cN/dtex and a CV value of 5.13%.

Embodiment 2

The cellulose fibers are prepared according to the same conditions as those in the embodiment 1, and the difference is as follows:

the NMMO aqueous solution with a mass concentration of 76% was fed; and pulp was prepared through mixing cellulose wood pulp DP:400 and bamboo pulp DP:300 which are in a mixing ratio of 52:48, and the cellulose concentration is 16%.

The obtained uniform mixture was subjected to continuous three-step evaporated dewatering in the dewatering device 2 to abtain the cellulose spinning stock solution, referring to FIG. 3, the retention time of each of first two steps was 9 min, and the spinning stock solution has the refractive index of 1.48623 and viscosity of 2849 Pa·S.

The prepared spinning stock solution was subjected to heat exchange to a temperature of 95° C. by a heat exchanger 4, then was extruded by the spinneret-pack and then entered the coagulating system 6, and the coagulating system is a three-stage coagulating system, referring to FIG. 4. The first-stage coagulating bath has an NMMO concentration of 70% and a temperature of 35° C.; the second-stage coagulating bath has an NMMO concentration of 55% and the temperature of room temperature; and the third-stage coagulating bath has an NMMO concentration of 40% and a temperature of 50° C.

The nascent fibers were subjected to rinsing by rinsing equipment 7, and the rinsing equipment 7 is nine-section spray rinsing equipment, referring to FIG. 5. Spray water of the first section has a concentration of 31% and a temperature of 80° C.; spray water of the second section has a concentration of 23% and a temperature of 80° C.; spray water of the third section has a concentration of 17% and a temperature of 60° C.; spray water of the fourth section has a concentration of 12% and a temperature of 60° C.; spray water of the fith section has a concentration of 8% and a temperature of 50° C.; spray water of the sixth section has a concentration of 5% and a temperature of 50° C.; spray water of the seventh section has a concentration of 3% and a temperature of 40° C.; spray water of the eighth section has a concentration of 1% and a temperature of 40° C.; and spray water of the ninth section has a concentration of 0% and a temperature of room temperature.

The NMMO aqueous solution in the recycling section was subjected to one-stage evaporation, was concentrated to 76% NMMO and used for dissolving cellulose. The prepared fibers have the strength of 4.31 cN/dtex and a CV value of 4.58%.

Embodiment 3

The cellulose fibers are prepared according to the same conditions as those in the embodiment 1, and the difference is as follows:

the NMMO aqueous solution with a mass concentration of 74% was fed; and pulp was prepared from cellulose wood pulp DP:300, and the cellulose concentration was 18%. The obtained uniform mixture was subjected to continuous two-step evaporated dewatering in the dewatering device 2 to abtain the cellulose spinning stock solution, referring to FIG.

3, the retention time of a first step was 25 min, and the spinning stock solution has the refractive index of 1.48714 and viscosity of 2415 Pa·S.

The prepared spinning stock solution was subjected to heat exchange to a temperature of 90° C. by the heat exchanger 4, then was extruded by spinneret-pack and then entered the coagulating system 6, and the coagulating system 6 is a three-stage coagulating system, referring to FIG. 4. The first-stage coagulating bath has an NMMO concentration of 65% and a temperature of 30° C.; the second-stage coagulating bath has an NMMO concentration of 35% and a temperature of 40° C.; and the third-stage coagulating bath has an NMMO concentration of 15% and a temperature of 70° C.

The nascent fibers were subjected to rinsing by rinsing equipment 7, and the rinsing equipment 7 is three-section spray rinsing equipment, referring to FIG. 5. Spray water of the first section has a concentration of 7% and a temperature of 60° C.; spray water of the second section has a concentration of 3% and a temperature of 50° C.; and spray water of the third section has a concentration of 0% and a temperature of room temperature.

The NMMO aqueous solution in the recycling section was subjected to one-stage evaporation, was concentrated to 74% NMMO and used for dissolving cellulose. The prepared fibers have the strength of 4.13 cN/dtex and a CV value of 4.79%.

Embodiment 4

The cellulose fibers are prepared according to the same conditions as those in the embodiment 1, and the difference is as follows:

the NMMO aqueous solution with a mass concentration of 75% was fed; and pulp was prepared through mixing cellulose cotton pulp DP:300 and hemp pulp DP:300 which are in a mixing ratio of 80:20, and the cellulose concentration is 20%. The obtained uniform mixture was subjected to continuous two-step evaporated dewatering in the dewatering device 2 to abtain the cellulose spinning stock solution, referring to FIG. 3, the retention time of a first step was 35 min, and the spinning stock solution has the refractive index of 1.48910 and viscosity of 3920 Pa·S.

The prepared spinning stock solution was subjected to heat exchange to a temperature of 100° C. by a heat exchanger 4, then was extruded by the spinneret-pack and then entered a coagulating system 6, the coagulating system 6 is a one-stage coagulating system, and referring to FIG. 4, the coagulating bath has an NMMO concentration of 51% and a temperature of room temperature.

The nascent fibers were subjected to rinsing by rinsing equipment 7, and the rinsing equipment is four-section spray rinsing equipment, referring to FIG. 5. Spray water of the first section has a concentration of 25% and a temperature of 70° C.; spray water of the second section has a concentration of 9% and a temperature of 50° C.; spray water of the third section has a concentration of 3% and a temperature of room temperature; and spray water of the fourth section has a concentration of 0% and a temperature of room temperature.

The NMMO aqueous solution in the recycling section was subjected to two-stage evaporation, was concentrated to 75% NMMO and used for dissolving cellulose. The prepared fibers have the strength of 4.22 cN/dtex and a CV value of 7.51%.

Embodiment 5

The cellulose fibers are prepared according to the same conditions as those in the embodiment 1, and the difference is as follows:

the NMMO aqueous solution with a mass concentration of 70% was fed, the obtained uniform mixture was subjected to continuous two-step evaporated dewatering in the dewatering device 2 to abtain the cellulose spinning stock solution, referring to FIG. 3, the retention time of a first step was 22 min, and the spinning stock solution has the refractive index of 1.48315.

The NMMO aqueous solution in the recycling section was subjected to one-stage evaporation, was concentrated to 70% NMMO and used for dissolving cellulose. The prepared fibers have the strength of 4.42 cN/dtex and a CV value of 5.21%.

Embodiment 6

The cellulose fibers are prepared according to the same conditions as those in the embodiment 1, and the difference is as follows:

the NMMO aqueous solution with a mass concentration of 60% was fed, the obtained uniform mixture was subjected to continuous three-step evaporated dewatering in the dewatering device 2 to abtain the cellulose spinning stock solution, referring to FIG. 3, the retention time of first two steps was 20 min, and the spinning stock solution has the refractive index of 1.48432.

The NMMO aqueous solution in the recycling section was subjected to one-stage evaporation, was concentrated to 60% NMMO and used for dissolving cellulose. The prepared fibers have the strength of 4.40 cN/dtex and a CV value of 5.37%.

Embodiment 7

The cellulose fibers are prepared according to the same conditions as those in the embodiment 1, and the difference is as follows:

the NMMO aqueous solution with a mass concentration of 85% was fed, the obtained uniform mixture was subjected to continuous one-step evaporated dewatering in the dewatering device 2 to abtain the cellulose spinning stock solution, and referring to FIG. 3, the spinning stock solution has the refractive index of 1.48613.

The NMMO aqueous solution in the recycling section was subjected to two-stage evaporation, was concentrated to 85% NMMO and used for dissolving cellulose. The prepared fibers have the strength of 4.38 cN/dtex and a CV value of 5.53%.

According to the low-energy-consumption method for preparing the cellulose fiber, provided by embodiments of the present disclosure, through comprehensively using a NMMO aqueous solution of a relatively low concentration to directly swell cellulose, a NMMO aqueous solution of a relatively higher concentration as coagulating bath to coagulating filament bundle and using a more water-saving rinsing mode and a more energy-saving evaporation concentrating technology, the present disclosure can greatly reduce equipment investment, simplify processing, reduce the energy consumption and the industrialization cost, and can facilitate the safe production, improve the uniformity and mechanical properties of the fiber, so that the preparation technology is more applicable to high-efficiency low-consumption industrial production. Although the preferred embodiments of the present disclosure are described, additional alterations and modifications of these embodiments can be made by those skilled in the art once a basic creative conception is known. Therefore, attached claims are intended to explain that the claims comprise the preferred embodiments and all alterations and modifications falling into the scope of the present disclosure.

Apparently, various changes and modifications can be made to the present disclosure by those skilled in the art without departing from the spirit and scope of the present disclosure. Thus, provided that these changes and modifications of the present disclosure belong to scopes of the claims of the present disclosure and equivalent technologies thereof, the present disclosure also intends to include these changes and modifications.

The invention claimed is:

1. A method for preparing cellulose fiber, wherein the method comprises the following steps:
 1) mixing cellulose pulp with a NMMO aqueous solution of a mass concentration of 60%- 85% to obtain a uniform mixture;
 2) subjecting the obtained uniform mixture to dewatering for swelling and dissolution, and deaerating to obtain a cellulose spinning stock solution;
 3) the cellulose spinning stock solution entering into a spinning machine after being filtered and heat exchange, and carrying out extruding by spinneret-pack and cooling by air; entering into a multistage coagulating system to coagulate to obtain nascent fiber, wherein the multistage coagulating system comprises a first stage coagulating bath and a second stage coagulating bath, wherein a NMMO concentration of the first stage coagulating bath is higher than 50% and lower than 72%; a NMMO concentration of the second stage coagulating bath is lower than the NMMO concentration of the first stage coagulating bath: and a temperature of the first stage coagulating bath is in a range from about room temperature up to about 80° C.; and
 4) subjecting the nascent fiber to rinsing to obtain a fiber filament bundle and performing subsequent-section treatment to obtain cellulose fiber.

2. The method according to claim 1, wherein along with the proceeding of the method, a NMMO aqueous solution obtained after rinsing is continuously added into a last stage coagulating system in step 3),
 a NMMO aqueous solution of the first stage coagulating bath is discharged into a recycling section,
 a mass concentration of a NMMO aqueous solution contained in the multistage coagulating system is kept stable under the condition of effective circulation of the NMMO aqueous solution, and
 the NMMO aqueous solution of the first stage coagulating bath entering the recycling section is subjected to recycling treatment and then is mixed with the cellulose pulp in step 1).

3. The method according to claim 2, wherein the NMMO aqueous solution to be recycled in the recycling section is subjected to coarse filtering, activated-charcoal adsorption and macropore resin filtering sequentially, and then enters to an evaporation section to be concentrated till a required feeding concentration for mixing with the cellulose pulp in step 1).

4. The method according to claim 3, wherein in an evaporation section, water vapor generated by evaporation is compressed and then returns to an evaporator as a heat source.

5. The method according to claim 3, wherein a concentration difference between the NMMO aqueous solution to be recycled and a concentrated feeding-required NMMO aqueous solution is smaller than 26%, and the number of evaporation stage is not greater than two.

6. The method according to claim 1, wherein in step 2), a dewatering process comprises one-step dewatering or continuous stepwise dewatering.

7. The method according to claim 6, wherein the dewatering process comprises continuous stepwise dewatering; and retention time of each step is adjustable.

8. The method according to claim 1, wherein in step 4), a rinsing process comprises one-section rinsing or multi-section rinsing; and
 a temperature of rinsing water is in a range of 10-80° C.

9. The method according to claim 8, wherein in the multi-section spray rinsing, a volume of spray water of each section is controlled, the rinsing water is sequentially returned to an upper section for rinsing in the upper section; and NMMO concentrations of the spray water in all sections are gradually decreased, and the spray water of a final section comes from water by recycling water vapor.

10. The method according to claim 8, wherein the rinsing process is multi-section spray rinsing, and the rinsing water and the fibers move in opposite directions.

11. The method according to claim 8, wherein temperatures of all sections decrease by gradient.

12. The method according to claim 1, wherein in step 1), the mass concentration of the NMMO aqueous solution is 70%-76%.

13. The method according to claim 1, wherein the NMMO concentration of the first stage coagulating bath is not lower than 51% and not higher than 65%.

* * * * *